United States Patent
Venketaraman et al.

(10) Patent No.: US 11,010,335 B2
(45) Date of Patent: May 18, 2021

(54) METHODS AND SYSTEMS FOR PROTECTING DATA OF A PERSISTENT MEMORY BASED FILE SYSTEM

(71) Applicant: NETAPP, INC., Sunnyvale, CA (US)

(72) Inventors: Sriram Venketaraman, Bangalore (IN); Amit Golander, Tel-Aviv (IL)

(73) Assignee: NETAPP, INC., Sunnyvale, CA (US)

( * ) Notice: Subject to any disclaimer, the term of this patent is extended or adjusted under 35 U.S.C. 154(b) by 318 days.

(21) Appl. No.: 16/193,414

(22) Filed: Nov. 16, 2018

(65) Prior Publication Data

US 2020/0050681 A1   Feb. 13, 2020

Related U.S. Application Data

(60) Provisional application No. 62/716,846, filed on Aug. 9, 2018.

(51) Int. Cl.
| | | |
|---|---|---|
| G06F 17/00 | (2019.01) | |
| G06F 7/00 | (2006.01) | |
| G06F 16/11 | (2019.01) | |
| G06F 16/16 | (2019.01) | |

(52) U.S. Cl.
CPC .......... *G06F 16/128* (2019.01); *G06F 16/164* (2019.01)

(58) Field of Classification Search
CPC .............................. G06F 16/128; G06F 16/164
USPC ......................................................... 707/639
See application file for complete search history.

(56) References Cited

U.S. PATENT DOCUMENTS

| | | | |
|---|---|---|---|
| 6,928,526 B1 * | 8/2005 | Zhu | G06F 3/0608 |
| | | | 711/118 |
| 6,934,822 B2 | 8/2005 | Armangau et al. | |
| 7,249,356 B1 * | 7/2007 | Wilson | G05B 23/0264 |
| | | | 718/101 |
| 7,529,782 B2 * | 5/2009 | Prahlad | G06F 11/1435 |
| | | | 707/999.204 |
| 8,364,920 B1 | 1/2013 | Parkison et al. | |
| 8,370,300 B2 | 2/2013 | Otani | |
| 8,484,164 B1 * | 7/2013 | Sivakumar | G06F 3/065 |
| | | | 707/657 |
| 9,678,670 B2 | 6/2017 | Golander et al. | |
| 9,892,041 B1 * | 2/2018 | Banerjee | G06F 12/0815 |

(Continued)

OTHER PUBLICATIONS

"Restoring and Deleting Persistent Disk Snapshots"; https://cloud.google.com/compute/docs/disks/restore-and-delete-snapshots; Jul. 25, 2018.

(Continued)

*Primary Examiner* — Pavan Mamillapalli
(74) *Attorney, Agent, or Firm* — Klein, O'Neill & Singh, LLP

(57) ABSTRACT

Methods and systems for a networked storage system is provided. One method includes creating a first snapshot for data units stored at a persistent memory of a computing device, the data units managed by a first file system; transferring metadata associated with the data units and the data units stored at the persistent memory to a storage device managed by a second file system using a logical object, the second file system executed by a storage system interfacing with the computing device; and generating a second snapshot of the logical object at the storage device, the second snapshot including data units and associated metadata of the first snapshot.

20 Claims, 9 Drawing Sheets

(56) References Cited

U.S. PATENT DOCUMENTS

| | | | |
|---|---|---|---|
| 9,928,246 B1 | 3/2018 | Xu et al. | |
| 10,152,493 B1* | 12/2018 | Kirsch | G06F 16/184 |
| 10,678,651 B1* | 6/2020 | Borodin | G06F 11/1458 |
| 2003/0158862 A1 | 8/2003 | Eshel et al. | |
| 2011/0060806 A1* | 3/2011 | Boscolo | H04L 43/065 |
| | | | 709/213 |
| 2012/0066182 A1* | 3/2012 | Chang | G06F 16/128 |
| | | | 707/639 |
| 2013/0275674 A1 | 10/2013 | Rangachari et al. | |
| 2013/0325824 A1* | 12/2013 | Shoens | G06F 16/16 |
| | | | 707/698 |
| 2017/0371889 A1 | 12/2017 | Golander et al. | |
| 2017/0371947 A1 | 12/2017 | Golander et al. | |
| 2019/0073272 A1* | 3/2019 | Marcotte | G06F 16/128 |

OTHER PUBLICATIONS

International Search Report and Written Opinion on corresponding PCT application (PCT/US2019/041069) from International Searching Authority (EPO) dated Oct. 25, 2019.

* cited by examiner

METHODS AND SYSTEMS FOR PROTECTING DATA OF A PERSISTENT MEMORY BASED FILE SYSTEM

CROSS-REFERENCE TO RELATED APPLICATION

This patent application claims priority under 35 USC § 119(e) to U.S. Provisional Patent Application, Ser. No. 62/716,846 filed on Aug. 9, 2018, entitled, "METHODS AND SYSTEM FOR PROTECTING DATA OF A PERSISTENT MEMORY BASED FILE SYSTEM", the disclosure of which is incorporated herein by reference in its entirety.

TECHNICAL FIELD

The present disclosure relates to networked storage systems, and particularly, to providing computing technology for taking snapshots for data units of a persistent memory based file system executed by a computing device communicating with a storage system executing another file system for managing mass storage devices.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple users with access to shared data, backing up data and others.

A storage system typically includes at least one computing system executing a storage operating system with a file system for storing and retrieving data on behalf of one or more client computing systems ("clients"). The storage operating system stores and manages shared data containers in a set of mass storage devices.

Newly emerging non-volatile or persistent memory (PM) technology may be implemented through a nonvolatile media attached to a central processing unit (CPU) of a computer. PM is characterized by low RAM-like latencies, and is typically substantially faster vis-à-vis flash-based SSD arrays (solid state devices) and HDDs (hard disk drive), respectively. PM is typically implemented using backed-up dynamic random access memory (DRAM, magneto-resistive random-access memory (MRAM) or spin-transfer torque magnetic random-access memory (STT-MRAM) technologies. Other technologies, such as resistive random-access memory (ReRAM and phase-change memory (PCM)) which are very dense, may enable cheaper, though slower, PM components.

File systems are usually block-based and are architected towards using HDDs and/or SSDs, and as such, do not store or cache user data on a PM. Typically, a separate software layer manages memory-based software caching. Emerging PM-aware file systems (e.g. EXT4-DAX) directly access PM, avoiding slow and cumbersome caching and/or memory map services of a virtual file system layer.

Typically, PM based file systems executed out of host computing systems initially store data units at the PM. The data units are later transferred to lower tier storage managed by a storage operating system of a storage system (or storage controller). Continuous efforts are being made to develop computing technology to efficiently protect data that is initially stored by the PM based file system and later moved to lower tier storage devices managed by a storage controller.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures.

DETAILED DESCRIPTION

As preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device type, in accordance with the claimed subject matter.

Figure 1A:
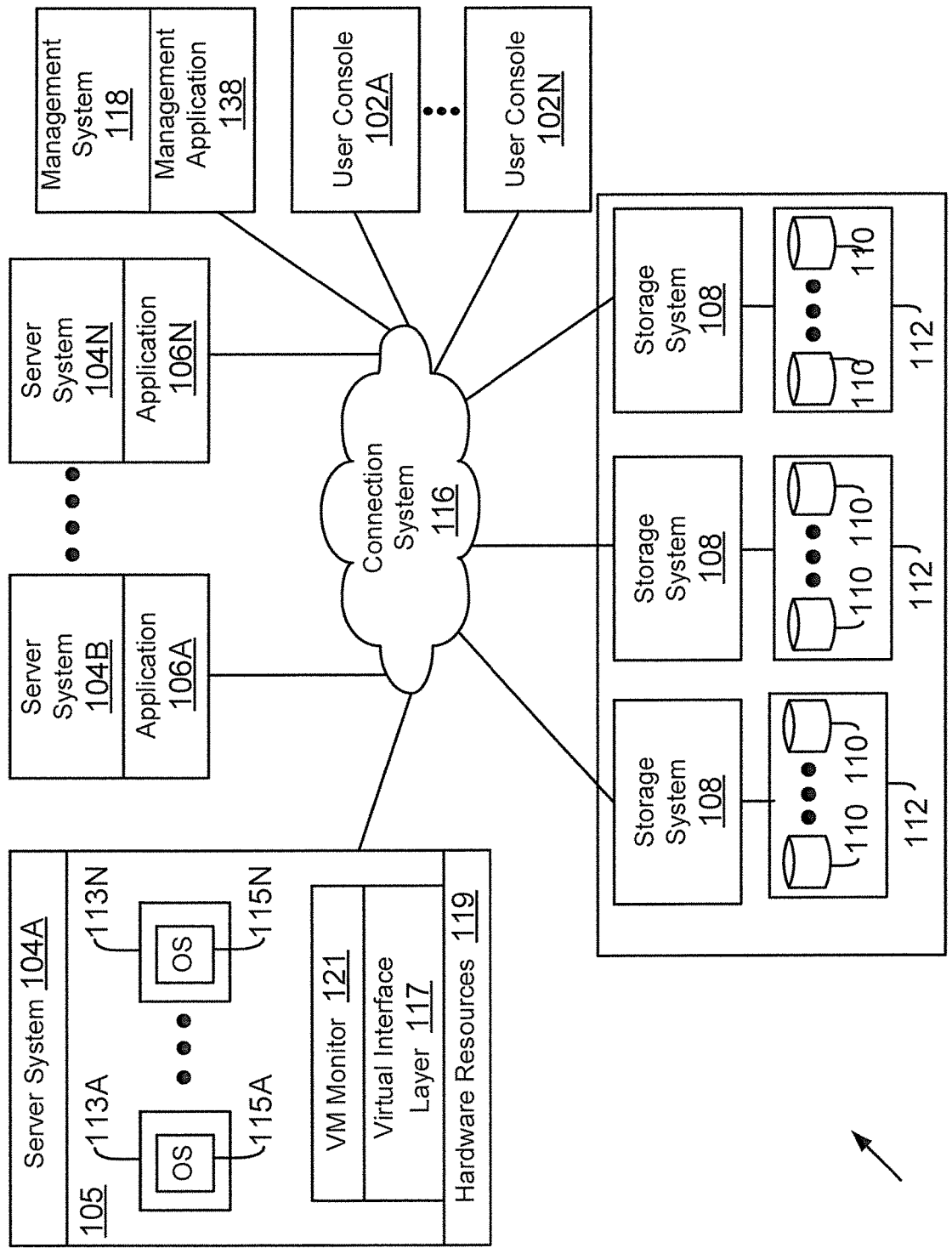
FIG. 1A shows an example of an operating environment for implementing the various aspects of the present disclosure.

System 100: FIG. 1A shows an example of a networked operating environment 100 (also referred to as system 100), for implementing the various adaptive aspects of the present disclosure. In one aspect, system 100 may include a plurality of computing systems 104A-104N (may also be referred to and shown as server system (or server systems) 104 or as host system (or host systems) 104) that may access one or more storage systems 108 via a connection system 116 such as a local area network (LAN), wide area network (WAN), the Internet and others. The server systems 104 may communicate with each other via connection system 116, for example, for working collectively to provide data-access service to user consoles (or computing devices) 102A-102N (may be referred to as user 102 or client system 102).

Server systems 104 may be computing devices configured to execute applications 106A-106N (may be referred to as application 106 or applications 106) over a variety of operating systems, including the UNIX® and Microsoft Windows® operating systems. Applications 106 may utilize data services of storage system 108 to access, store, and manage data in a set of storage devices 110 that are described below in detail. Applications 106 may include a database program, an email program or any other computer executable program. The server systems may also execute a persistent memory-based file system that stores data in persistent memory of the server system, as described below in detail.

Some of the server systems 104 may also utilize file-based access protocols when accessing information (in the form of files and directories) over a network attached storage (NAS)-based network. Alternatively, server systems 104 may use block-based access protocols, for example, the Small Computer Systems Interface (SCSI) protocol encapsulated over TCP (iSCSI) and SCSI encapsulated over Fibre Channel (FCP) to access storage via a storage area network (SAN).

As an example, server 104A executes a virtual machine environment 105, according to one aspect. In the virtual machine environment 105, a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software". In addition, resources available within the VM may be referred to herein as "guest resources".

The guest software expects to operate as if it were running on a dedicated computer rather than in a VM. That is, the guest software expects to control various events and have access to hardware resources on a physical computing system (may also be referred to as a host platform) which may be referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

The virtual machine environment 105 includes a plurality of VMs 113A-113N that execute a plurality of guest OS 115A-115N (may also be referred to as guest OS 115) to share hardware resources 119. As described above, hardware resources 119 may include CPU, memory, I/O devices, storage or any other hardware resource.

A virtual machine monitor (VMM) 121, for example, a processor executed hypervisor layer provided by VMWare Inc., Hyper-V layer provided by Microsoft Corporation (without derogation of any third party trademark rights) or any other virtualization layer type, presents and manages the plurality of guest OS 115. VMM 121 may include or interface with a virtualization layer (VIL) 117 that provides one or more virtualized hardware resource 119 to each guest OS. For example, VIL 117 presents physical storage at storage devices 110 as virtual storage (for example, as a virtual hard drive (VHD)) to VMs 113A-113N. The VMs use the VHDs to store information at storage devices 110.

In one aspect, VMM 121 is executed by server system 104A with VMs 113A-113N. In another aspect, VMM 121 may be executed by a separate stand-alone computing system, often referred to as a hypervisor server or VMM server and VMs 113A-113N are presented via another computer system. It is noteworthy that various vendors provide virtualization environments, for example, VMware Corporation, Microsoft Corporation (without derogation of any third party trademark rights) and others. The generic virtualization environment described above with respect to FIG. 1A may be customized depending on the virtual environment provider.

System 100 may also include a management system 118 for managing and configuring various elements of system 100. Management system 118 may execute or include a management application 138 for coordinating snapshots (i.e. point in time copy) of data stored by the storage system 108.

In one aspect, storage system 108 is a shared storage system having access to a set of mass storage devices 110 (may be referred to as storage devices 110 or "L3 storage") within a storage subsystem 112. As an example, storage devices 110 may be a part of a storage array within the storage sub-system 112. Storage devices 110 are used by the storage system 108 for storing information. The storage devices 110 may include writable storage device media such as magnetic disks, video tape, optical, DVD, magnetic tape, non-volatile memory devices for example, self-encrypting drives, flash memory devices and any other similar media adapted to store information. The storage devices 110 may be organized as one or more groups of Redundant Array of Independent (or Inexpensive) Disks (RAID). The various aspects disclosed herein are not limited to any particular storage device or storage device configuration.

In one aspect, to facilitate access to storage devices 110, a storage operating system of storage system 108 "virtualizes" the storage space provided by storage devices 110. The storage system 108 can present or export data stored at storage devices 110 to server systems 104 and VMM 121 as a storage volume or one or more qtree sub-volume units including logical unit numbers (LUNs). Each storage volume may be configured to store data files (or data containers or data units), scripts, word processing documents, executable programs, and any other type of structured or unstructured data. From the perspective of the VMS/server systems, each volume can appear to be a single disk drive. However, each volume can represent the storage space in one disk, an aggregate of some or all of the storage space in multiple disks, a RAID group, or any other suitable set of storage space.

It is noteworthy that the term "disk" as used herein is intended to mean any storage device/space and not to limit the adaptive aspects to any particular type of storage device, for example, hard disks.

The storage system 108 may be used to store and manage information at storage devices 110 based on a request generated by server system 104, management system 118, user 102 and/or a VM. The request may be based on file-based access protocols, for example, the CIFS or the NFS protocol, over TCP/IP.

Alternatively, the request may use block-based access protocols, for example, iSCSI or FCP.

As an example, in a typical mode of operation, server system 104 (or VMs 113A-113N) transmits one or more input/output (I/O) commands, such as an NFS or CIFS request, over connection system 116 to the storage system 108. Storage system 108 receives the request, issues one or more I/O commands to storage devices 110 to read or write the data on behalf of the server system 104, and issues an NFS or CIFS response containing the requested data over the connection system 116 to the respective server system 104.

In one aspect, storage system 108 may have a distributed architecture, for example, a cluster based system that may include a separate network module and storage module, described below in detail with respect to FIG. 2A. Briefly, the network module is used to communicate with server systems 104 and management system 118, while the storage module is used to communicate with the storage devices 110.

Figure 1B:
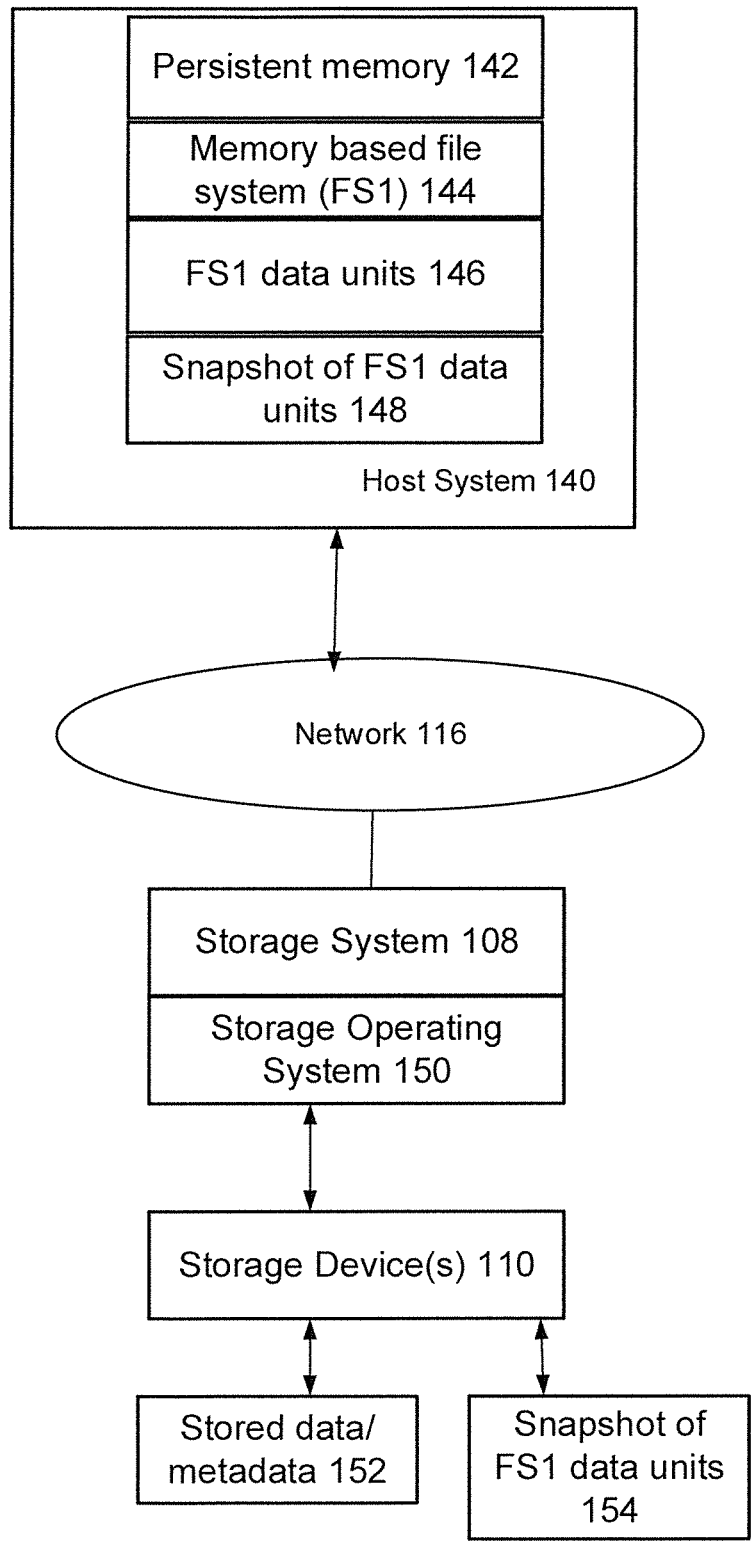
FIG. 1B shows a block diagram of a system with a persistent memory based file system, used according to one aspect of the present disclosure.

Persistent Memory Based File System: FIG. 1B shows a block diagram of a system where a persistent memory (PM) based file system (FS1) 144 is executed out of a PM 142 of a host system 140. The host system 140 may be similar to servers 104 described above and interfaces with the storage system 108 that executes a storage operating system 150 with a file system (may be referred to as a second file system). FS1 144 stores data units 146 at PM 142. The data units may be stored for client applications and other processes executed by host system 140. A snapshot 148 is taken by FS1 144 and may be stored at PM 142, as described below in detail. The term snapshot means a point-in-time copy that captures a state of a file system at any given time. Snapshot 148 is a point in time copy of data units 146 stored at PM 142 by FS1 144.

The storage devices 110 managed by the storage operating system 150 store data units and associated metadata 152 using one or more LUNs/volumes. The storage devices 110 also store snapshot 154 of the active FS1 144 of host system 140, as described below in detail.

In one aspect, the system of FIG. 1B uses two storage tiers; a memory addressable first tier (PM 142) and a block addressable second tier (storage devices 110). FS1 144 manages the first tier (i.e. PM 142) and the storage operating system 150 manages the second tier (i.e. storage devices 110).

When an application writes data, the data is first written to the first tier 142 as data units 146 and the write operation is acknowledged. The data units are then written to the second tier 110, when space in the first tier reaches a certain threshold level, to prevent repeated overwrites from getting written to the second tier.

At any given time, a first portion of file system data (i.e. data units stored by FS1 144) (e.g. X %) may be present in the first tier and a second portion is stored at the second tier, managed by storage operating system 150. To take a snapshot of all the data units, a snapshot operation has to take a point in time copy of data units that span across both storage tiers. This involves writing data that is present in the first tier to the second tier and then taking a snapshot of the second tier. The amount of time it takes to flush data to the second tier is proportional to the size of the first tier and the bandwidth available to write the data to the second tier. To flush the data units from the first tier to the second tier, any I/O (Input/output) requests are fenced (or held) until a flush operation has been completed.

To reduce the amount of time application I/O requests are fenced, the systems and processes disclosed herein take a snapshot of the first tier and then unfences new and pending I/O requests i.e. application requests for reading and writing data are executed. Subsequently, only the data units present in the snapshot and not yet written to the second tier have to be written to the second tier. It is noteworthy that it is not enough to write the data blocks to second tier during the snapshot operation, metadata associated with the data blocks is also written.

The snapshot at the second tier includes the snapshot of the first tier with both data units and associated metadata. The snapshot of the second tier can be used for different reasons, including, data protection, remote protection using SnapMirror (without derogation of any trademark rights), clones, and for restore operations. A restore operation regenerates the first tier with metadata blocks included in the second tier snapshot and enables read/write access to data by FS1 144.

It is noteworthy that snapshots in the first tier can use limited PM 142 pages. To prevent excessive usage of PM pages in the first tier, snapshots of the first tier that have been written to the second tier may be deleted, as described below in detail.

Figure 1C:
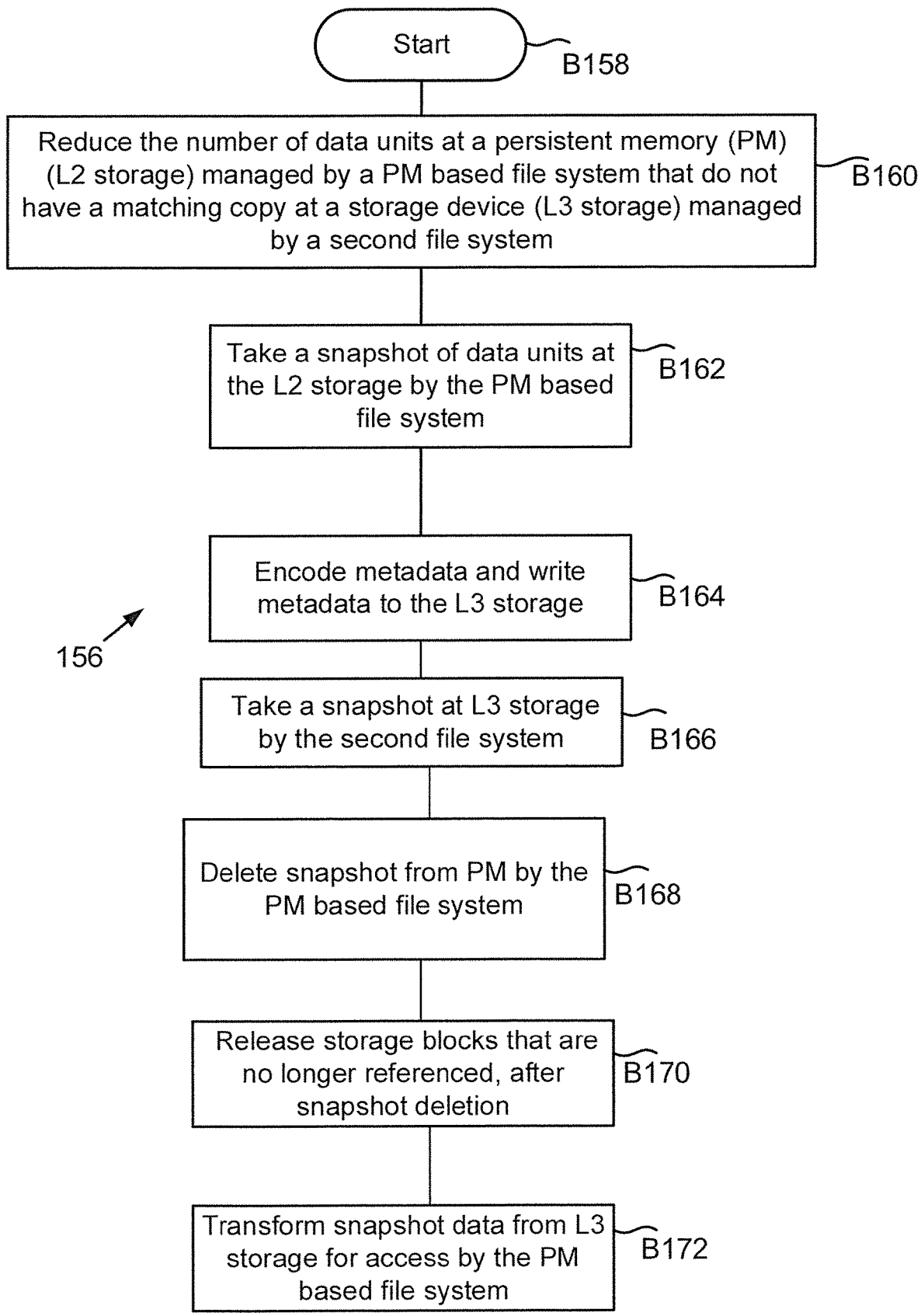
FIG. 1C shows an example of a process for taking snapshots, according to one aspect of the present disclosure.

Process Flow: FIG. 1C shows a process flow 156, according to one aspect of the present disclosure. Process 156 begins in block B158 when the host system 140 and the storage system 108 are initialized and operational. Before taking a FS1 144 based snapshot, an optional block B160 is executed. Block B160, reduces the number of data units that have a valid copy at PM 142 (also referred to as L2 storage of first tier storage) but have not been transferred or flushed to a LUN at storage devices 110 (also referred to as L3 storage or second tier storage). FS1 144 typically operates by writing to PM 142 and then acknowledging modifications to an application that initiates write operations. The data unit that is written by FS1 144 is not immediately written out to storage device 110 for performance reasons. In block B160, the number of data units that are still at PM 142 are flushed to storage devices 110, which reduces the time to take a snapshot of PM 142 that stores data units 146. Block B160 is executed before a snapshot is taken of PM 142.

In block B162, a snapshot (referred to as L2 snap-1 (FIGS. 1D-1E) is taken by FS1 144. In one aspect, before taking the snapshot, any I/O request by one or more applications is fenced (i.e. held) to complete the snapshot operation by FS1 144. The amount of time it takes to write data to the LUNs at storage devices 110 is proportional to the amount of data units at PM 142. By taking an instantaneous snapshot in the PM-based filesystem, I/Os can be unfenced quickly.

After the snapshot is taken, in block B164, the metadata for the data units in L2 snapshot is encoded and written to storage devices 110. The metadata includes timestamps, access rights, a unique identifier for the snapshot, storage location of the snapshot, size of the snapshot, number of data units or any other information (pointers, links and others) that may be needed to restore data units and metadata associated with the data units from the snapshot. The metadata is encoded such that the metadata can be represented from a memory representation of PM 142 to a block representation at storage devices 110. This may be accomplished by encoding block numbers as offsets within the metadata. Metadata encoding details are also provided in U.S. Pat. No. 9,678,670, the disclosure of which is incorporated herein by reference in its entirety. In one aspect, the data blocks that belong to the snapshot taken by FS1 144 are identified. The data units are written to a pre-determined offset at LUNs of storage devices 110, if the units were not written earlier in block B160. It is noteworthy that only incremental data units across different snapshots are written to the LUNs at storage devices 110. The data units written to the LUNs are compressed, compacted and deduplicated. After writing the data blocks to the LUNs, the metadata blocks belonging to the snapshot are encoded in a similar fashion and written to the LUNs.

Figure 1D:
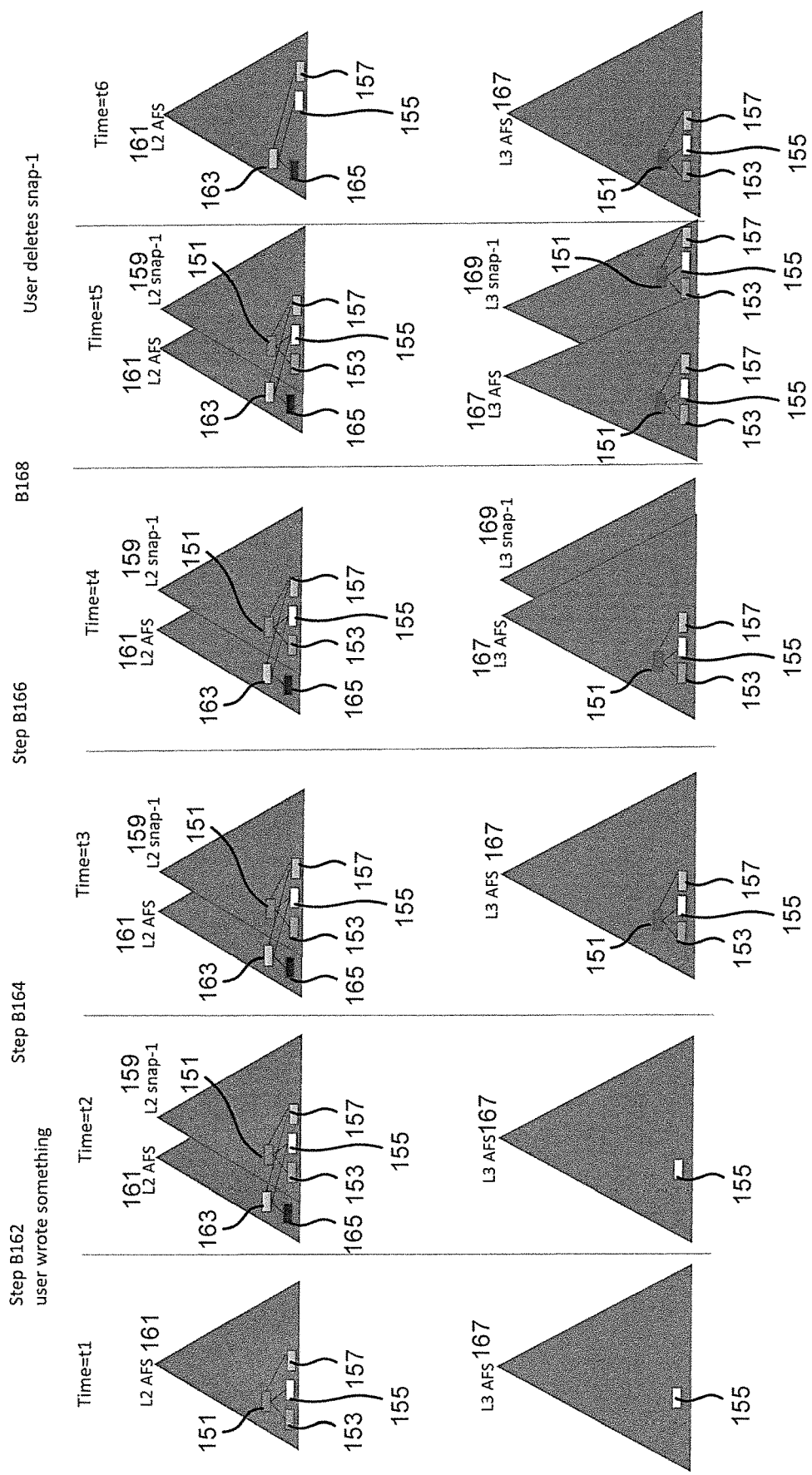
FIGS. 1D-1E illustrate the process blocks of FIG. 1C, according to one aspect of the present disclosure.
Figure 1E:
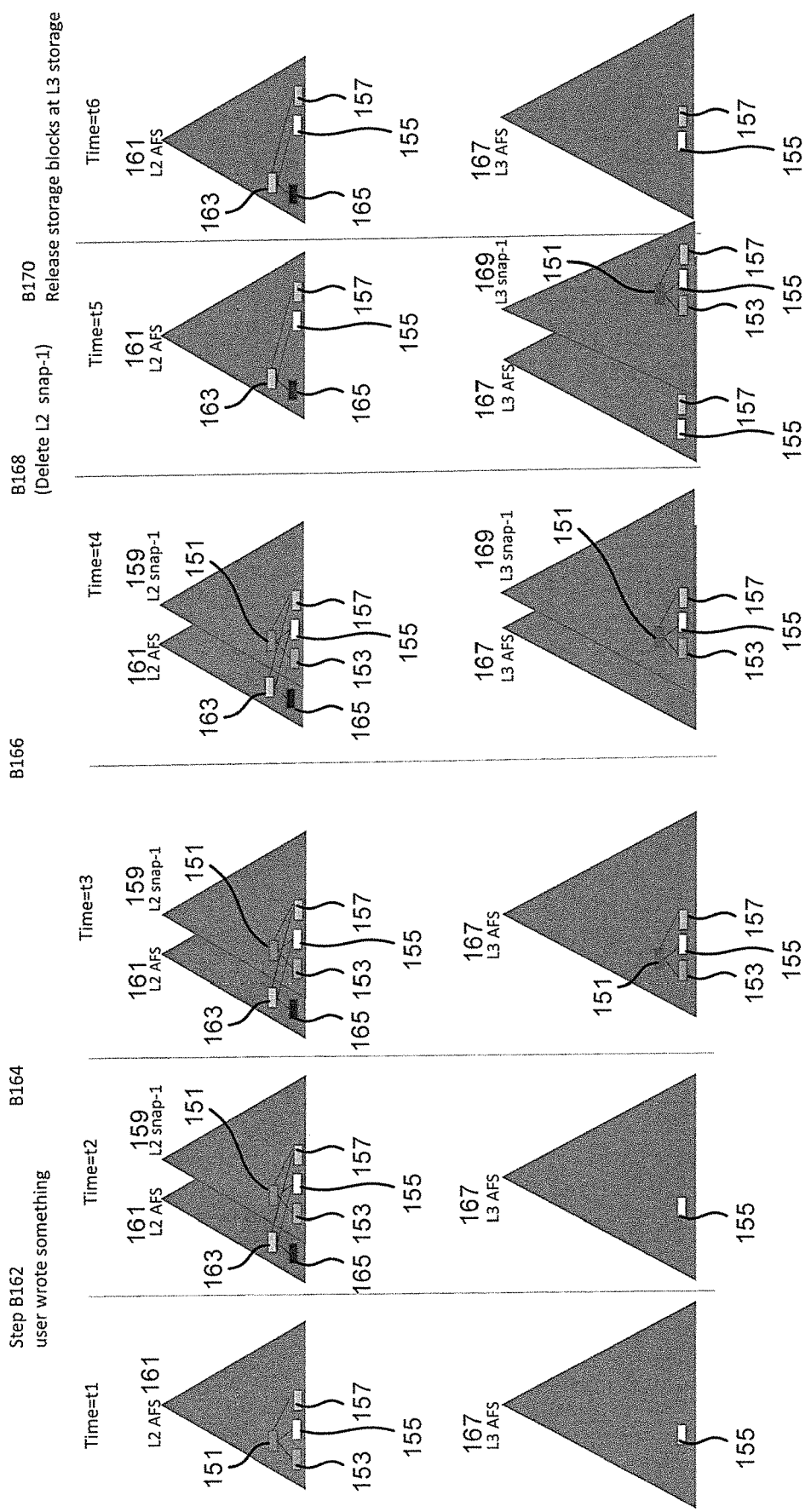

In block B166, a snapshot of the LUNs at storage device 110 is taken. This snapshot is referred to as L3 snap-1 (FIGS. 1D-1E). In one aspect, the LUN based snapshot is taken after the data units and the metadata blocks of the PM-filesystem snapshot (L2 snap-1) have been flushed to the LUNs of storage devices 110. The L3 snapshot is uniquely identified and indicates that the FS1 144 snapshot is included in it. Each snapshot of the LUNs of storage device 110 may have multiple FS1 144 snapshots. The FS1 144 snapshots metadata links the valid PM-filesystem snapshots in a L3 snapshot.

In block B168, the FS1 144 based snapshot or its data units may be optionally deleted. This reclaims storage space at PM 142.

In block B170, storage blocks for LUNs at the storage devices 110 are released if they are no longer referenced by the deleted snapshot.

In block B172, optionally, reverse transform the snapshot data units within the L3 snap-1 to the FS1 144. To access (read and write) the data units stored at storage devices 110, a writeable copy of the LUNs is created and the FS1 144 metadata stored at the LUNs is transformed to a new FS1 144 instance.

FIG. 1D shows an example of the process blocks of FIG. 1C without the steps involved in block B170. FIG. 1E shows an example of the process blocks of FIG. 1C without the steps involved in block B172.

Figure 1F:
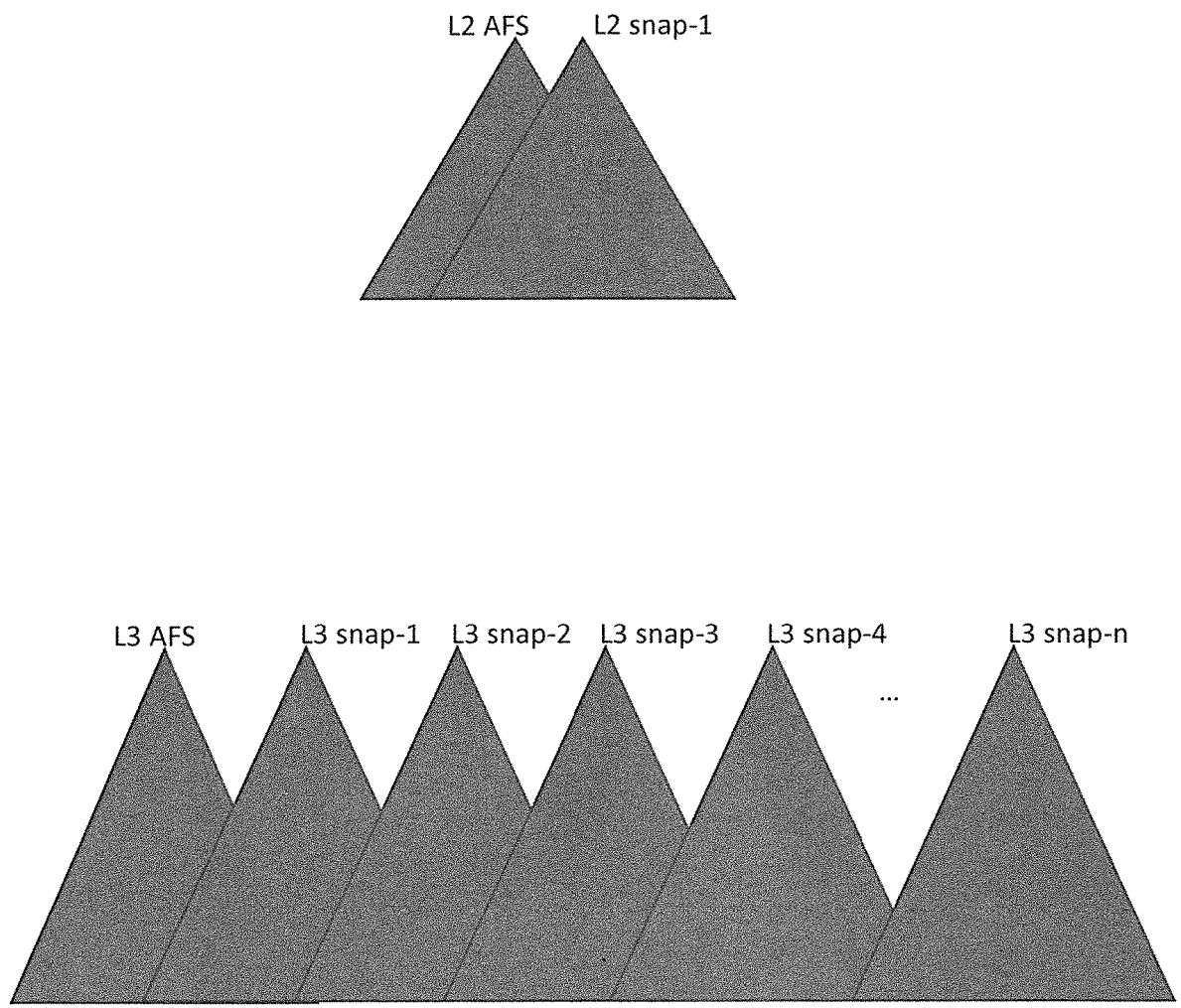
FIG. 1F shows an example of retaining a snapshot at a persistent memory, according to one aspect of the present disclosure.

FIG. 1F shows an example, where snapshots are left at the host system. This allows for faster lookups in L2 snap-1, faster recovery to snap-1 and faster snapshot operation for a next snapshot.

FIG. 1D shows the various process blocks of FIG. 1C between time t1 and time t6. At time t1, the L2 active file system (AFS) 161 (L2 AFS 161) has a metadata node 151 and data units 153, 155 and 157. Data unit 155 has been transferred to a LUN at storage device 110 managed by L3 AFS 167. Between time t1 and t2, the L2 snap-1 159 has been taken. The user has also written to block 165 with root node 163. Between time t2 and t3, the metadata 151 and data units 153, 155 and 157 have been transferred to the LUNs at L3 storage.

Between t3 and t4, a snapshot 169 of the L3 LUN is taken. The L3 AFS still retains 151, 153, 155 and 157 blocks. Between t4 and t5, a delete process to delete the snapshot is initiated. Between t5 and t6, the L2 AFS uses root node 163 and blocks 165, 155 and 157. The L3 AFS still retains 151, 153, 155 and 157 and hence use extra storage space at L3 storage.

FIG. 1E shows all the process blocks of FIG. 1D but also shows at time t6 that blocks 151 and 153 are released since they are no longer referenced by the L2 AFS and the L3 snap-1 has all the data units of L2 snap-1.

In one aspect, methods and systems for a networked storage system is provided. One method includes creating a first snapshot for data units stored at a persistent memory of a computing device, the data units managed by a first file system; transferring metadata associated with the data units and the data units stored at the persistent memory to a storage device managed by a second file system using a logical object, the second file system executed by a storage system interfacing with the computing device; and generating a second snapshot of the logical object at the storage device, the second snapshot including data units and associated metadata of the first snapshot.

Clustered Storage System: FIG. 2A depicts an illustrative aspect of a shared, storage environment 200 using the L3 storage described above. The shared, storage environment 200 includes the management system 118, a plurality of server systems 204.1-204.2 (similar to server systems 104), a clustered storage system 202 and at least one computer network 206 communicably connecting the server systems 204.1-204.2 and the clustered storage system 202.

The clustered storage system 202 includes a plurality of nodes 208.1-208.3, a cluster switching fabric 210, and a plurality of mass storage devices 212.1-212.3 (similar to 110, FIG. 1A). Each of the plurality of nodes 208.1-208.3 is configured to include a network module, a storage module, and a management module, each of which can be implemented as a separate processor executable or machine implemented module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3.

The network modules 214.1-214.3 include functionality that enables the respective nodes 208.1-208.3 to connect to one or more of the client systems 204.1-204.2 over the computer network 206, while the storage modules 216.1-216.3 connect to one or more of the storage devices 212.1-212.3.

The management modules 218.1-218.3 provide management functions for the clustered storage system 202. Accordingly, each of the plurality of server nodes 208.1-208.3 in the clustered storage server arrangement provides the functionality of a storage server.

A switched virtualization layer including a plurality of virtual interfaces (VIFs) 220 is provided below the interface between the respective network modules 214.1-214.3 and the client systems 204.1-204.2, allowing storage 212.1-212.3 associated with the nodes 208.1-208.3 to be presented to the client systems 204.1-204.2 as a single shared storage pool. For example, the switched virtualization layer may implement a virtual interface architecture. FIG. 2A depicts only the VIFs 220 at the interfaces to the network modules 214.1, 214.3 for clarity of illustration.

The clustered storage system 202 can be organized into any suitable number of virtual servers (VServer or storage virtual machines (SVM)) 222A-222N, in which each virtual storage system represents a single storage system namespace with separate network access. Each virtual storage system has a user domain and a security domain that are separate from the user and security domains of other virtual storage systems. Server systems 204 can access storage space via a VServer from any node of the clustered system 202.

Each of the nodes 208.1-208.3 may be defined as a computer adapted to provide application services to one or more of the client systems 204.1-204.2. In this context, a SVM is an instance of an application service provided to a client system. The nodes 208.1-208.3 are interconnected by the switching fabric 210, which, for example, may be embodied as a Gigabit Ethernet switch or any other switch type.

Figure 2A:
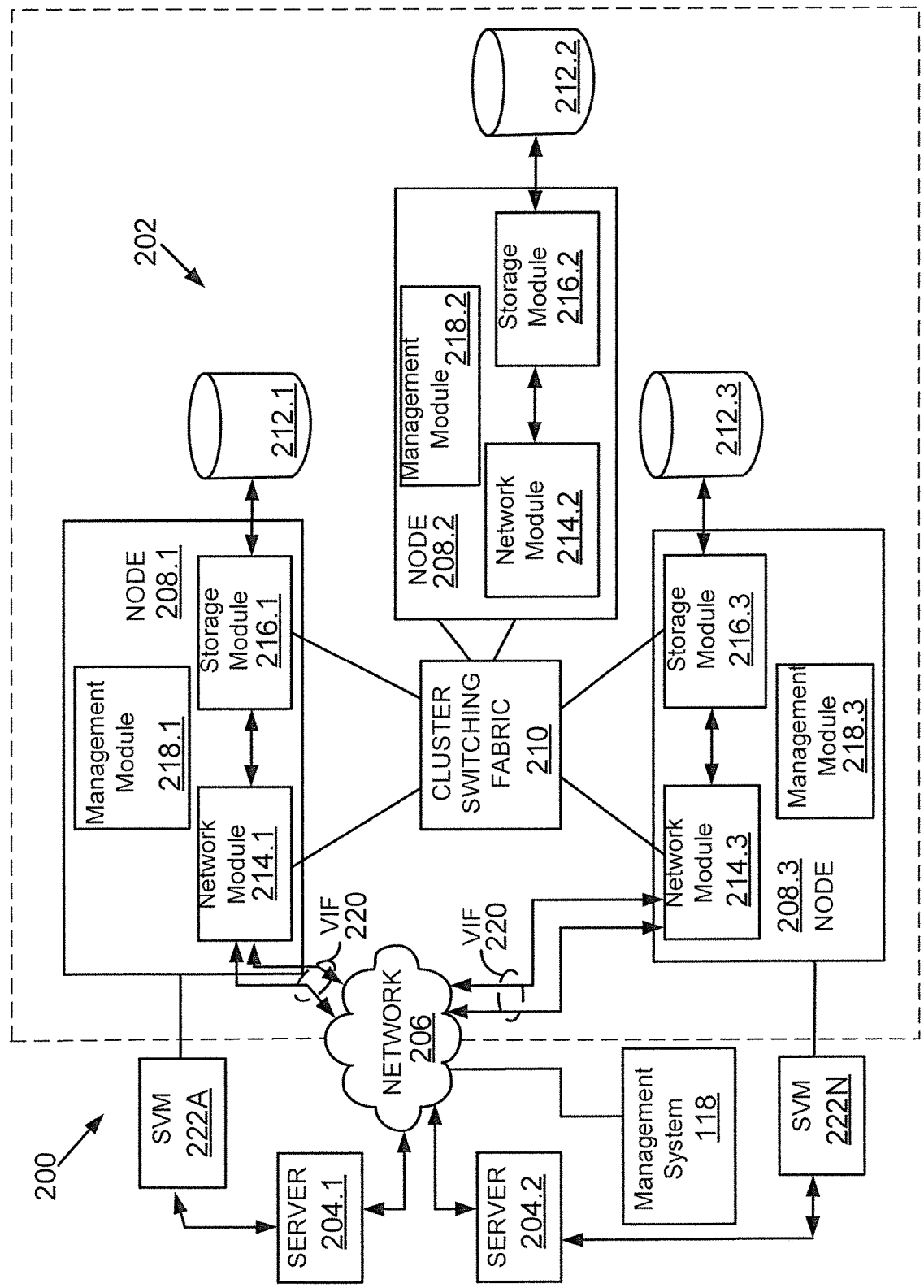
FIG. 2A shows an example of a clustered storage system, used according to one aspect of the present disclosure.

Although FIG. 2A depicts three network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules.

The server systems 204.1-204.2 of FIG. 2A may be implemented as computing devices configured to interact with the respective nodes 208.1-208.3 in accordance with a client/server model of information delivery. In the presently disclosed aspect, the interaction between the server systems 204.1-204.2 and the nodes 208.1-208.3 enable the provision of network data storage services. Specifically, each server system 204.1, 204.2 may request the services of one of the respective nodes 208.1, 208.2, 208.3, and that node may return the results of the services requested by the client system by exchanging packets over the computer network 206, which may be wire-based, optical fiber, wireless, or any other suitable combination thereof. The server systems 204.1-204.2 may issue packets according to file-based access protocols, such as the NFS or CIFS protocol, when accessing information in the form of files and directories.

In a typical mode of operation, one of the server systems 204.1-204.2 transmits an NFS or CIFS request for data to one of the nodes 208.1-208.3 within the clustered storage system 202, and the VIF 220 associated with the respective node receives the client request. It is noted that each VIF 220 within the clustered system 202 is a network endpoint having an associated IP address. The server request typically includes a file handle for a data file stored in a specified volume on at storage 212.1-212.3.

Figure 2B:
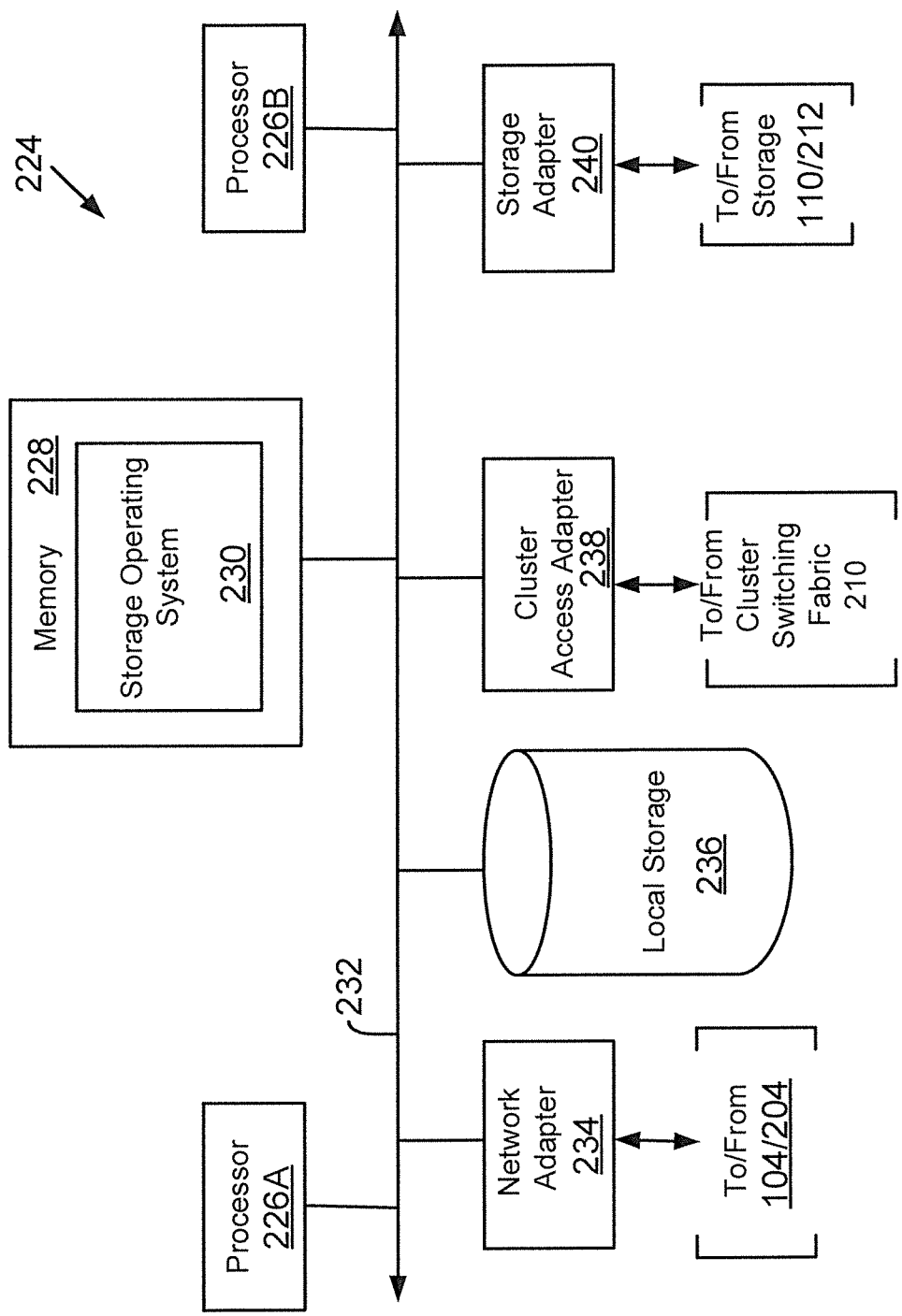
FIG. 2B shows an example of a storage system node, used according to one aspect of the present disclosure.

Storage System Node: FIG. 2B is a block diagram of a computing system 224, according to one aspect. System 224 may be used by a stand-alone storage system 108 and/or a storage system node operating within a cluster based storage system described above with respect to FIG. 2A.

System 224 may include a plurality of processors 226A and 226B, a memory 228, a network adapter 234, a cluster access adapter 238 (used for a cluster environment), a storage adapter 240 and local storage 236 interconnected by a system bus 232. The local storage 236 comprises one or more storage devices, such as disks, utilized by the processors to locally store configuration and other information.

The cluster access adapter 238 comprises a plurality of ports adapted to couple system 224 to other nodes of a cluster as described above with respect to FIG. 2A. In the illustrative aspect, Ethernet may be used as the clustering protocol and interconnect media, although it will be apparent to those skilled in the art that other types of protocols and interconnects may be utilized within the cluster architecture described herein.

System 224 is illustratively embodied as a dual processor storage system executing a storage operating system 230 (or 150, FIG. 1B) that preferably implements a high-level module, such as a file system, to logically organize information as a hierarchical structure of named directories, files and special types of files called virtual disks (hereinafter generally "blocks") on storage devices 110/212. However, it will be apparent to those of ordinary skill in the art that the system 224 may alternatively comprise a single or more than two processor systems. Illustratively, one processor 226 executes the functions of a network module on a node, while the other processor 226B executes the functions of a storage module.

The memory 228 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions described herein.

The storage operating system 230, portions of which is typically resident in memory and executed by the processing elements, functionally organizes the system 224 by, inter alia, invoking storage operations in support of the storage service provided by storage system 108. An example of operating system 230 is the DATA ONTAP® (Registered trademark of NetApp, Inc. operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

The network adapter 234 comprises a plurality of ports adapted to couple the system 224 to one or more server systems over point-to-point links, wide area networks, virtual private networks implemented over a public network (Internet) or a shared local area network. The network adapter 234 thus may comprise the mechanical, electrical and signaling circuitry needed to connect storage system 108 to the network. Illustratively, the computer network may be embodied as an Ethernet network or a FC network.

The storage adapter 240 cooperates with the storage operating system 230 executing on the system 224 to access information requested by the server systems 104 and management system 118 (FIG. 1A). The information may be stored on any type of attached array of writable storage device media such as video tape, optical, DVD, magnetic tape, bubble memory, electronic random access memory, flash memory devices, micro-electro mechanical and any other similar media adapted to store information, including data and parity information.

The storage adapter 240 comprises a plurality of ports having input/output (I/O) interface circuitry that couples to the disks over an I/O interconnect arrangement, such as a conventional high-performance, FC link topology.

In another aspect, instead of using a separate network and storage adapter, a converged adapter is used to process both network and storage traffic.

Figure 3:
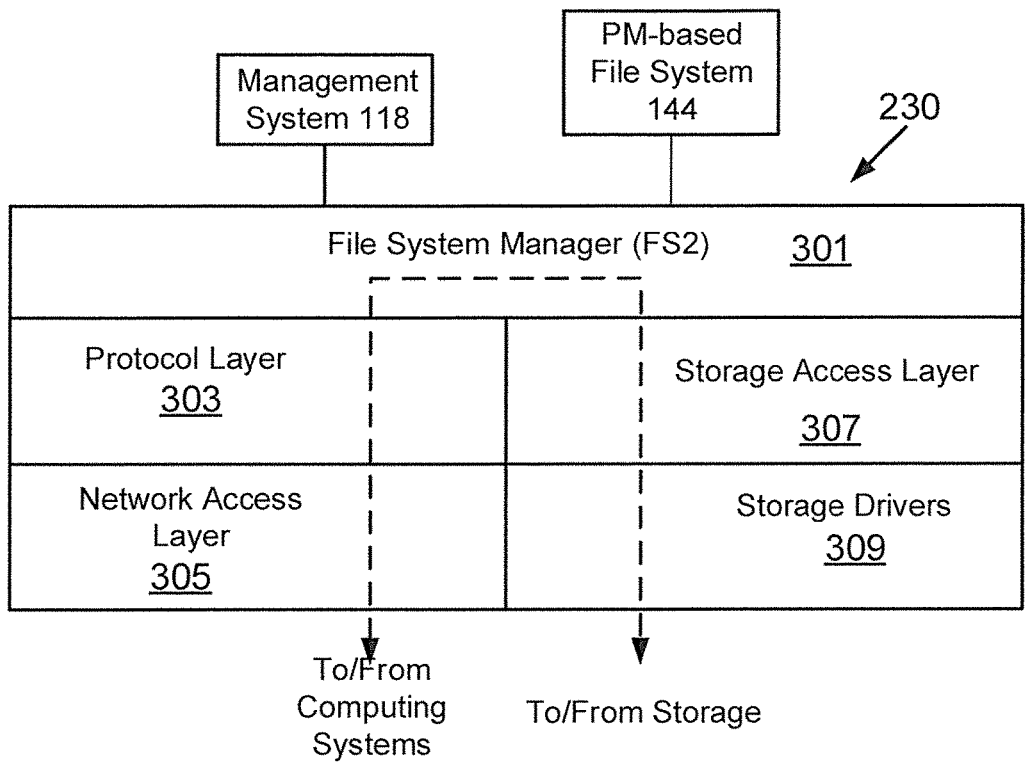
FIG. 3 shows an example of a storage operating system, used according to one aspect of the present disclosure.

Operating System: FIG. 3 illustrates a generic example of operating system 230 executed by storage system 108, according to one aspect of the present disclosure. Storage operating system 230 interfaces with the management system 118 and file system 144.

As an example, operating system 230 may include several modules, or "layers". These layers include a file system manager 303 (e.g. L3 AFS) that keeps track of a directory structure (hierarchy) of the data stored in storage devices and manages read/write operations, i.e. executes read/write operations on disks in response to server system 104/140 (FIG. 1B) requests.

Operating system 230 may also include a protocol layer 303 and an associated network access layer 305, to allow system 200 to communicate over a network with other systems, such as server system 104 and management system 118. Protocol layer 303 may implement one or more of various higher-level network protocols, such as NFS, CIFS, Hypertext Transfer Protocol (HTTP), TCP/IP and others, as described below.

Network access layer 305 may include one or more drivers, which implement one or more lower-level protocols to communicate over the network, such as Ethernet. Interactions between server systems 104 and mass storage devices 110/212 are illustrated schematically as a path, which illustrates the flow of data through operating system 230.

The operating system 230 may also include a storage access layer 307 and an associated storage driver layer 309 to communicate with a storage device. The storage access layer 307 may implement a higher-level disk storage protocol, such as RAID (redundant array of inexpensive disks), while the storage driver layer 309 may implement a lower-level storage device access protocol, such as FC or SCSI.

It should be noted that the software "path" through the operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage system 108.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems.

Figure 4:
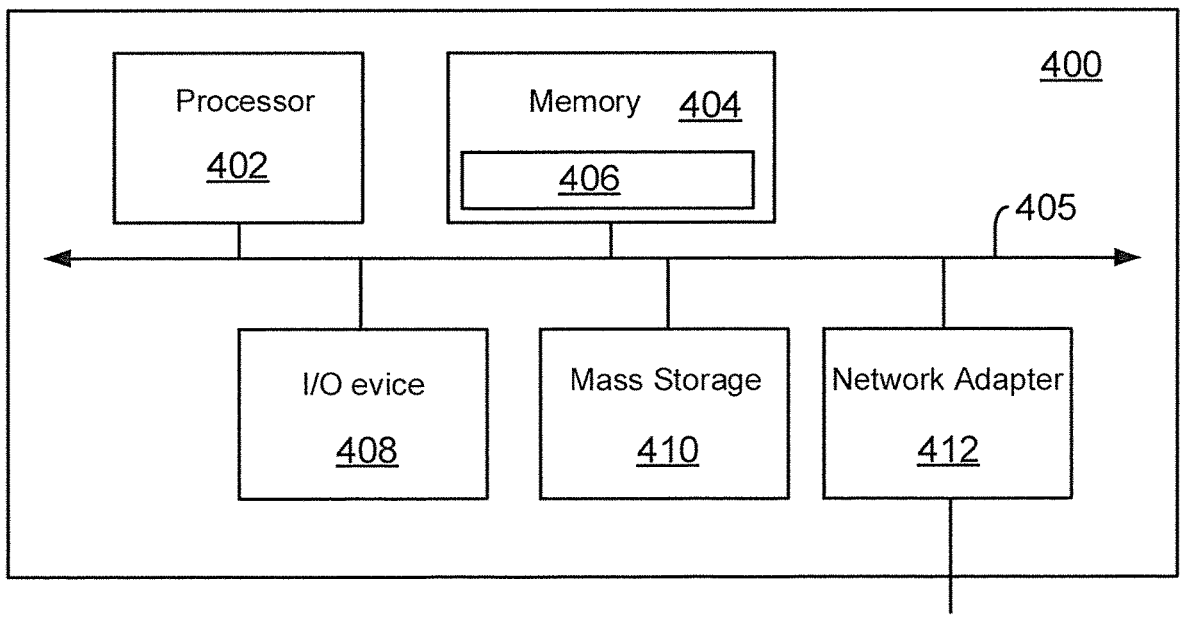
FIG. 4 shows an example of a processing system, used according to one aspect of the present disclosure.

Processing System: FIG. 4 is a high-level block diagram showing an example of the architecture of a processing system, at a high level, in which executable instructions as described above can be implemented. The processing system 400 can represent modules of host system 140, management system 118, user console 102, server systems 104, and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain aspects, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include code for executing the process blocks of FIG. 1C. Memory 404 may be similar to PM 142 storing data units and FS 1 144.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Thus, methods and systems for protecting data have been described. Note that references throughout this specification to "one aspect" or "an aspect" mean that a particular feature, structure or characteristic described in connection with the aspect is included in at least one aspect of the present invention. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising;
transferring at a first time via a network connection, data units stored at a persistent memory of a computing device managed by a first file system to a storage device of a storage system managed by a second file system, the first file system operating as a persistent memory-based file system;

generating by the first file system, at a second time, a first snapshot of data units remaining at the persistent memory, after the data units have been transferred to the storage device of the storage system at the first time;

transferring at a third time, metadata for data units in the first snapshot, metadata associated with data units remaining at the persistent memory between the second and third time, and the data units remaining at the persistent memory between the second and third time;

after the third time, generating a second snapshot of a logical object at the storage device by the second file system, the second snapshot including the transferred metadata at the third time and data units transferred at the first time and the third time; and deleting the first snapshot at the computing device, after the second snapshot is generated and releasing storage blocks from the persistent memory associated with the first snapshot.

2. The method of claim 1, further comprising: using the second snapshot for restoring data units and associated metadata for use by the first file system.

3. The method of claim 1, further comprising: after the second snapshot and upon deleting the first snapshot, releasing data blocks at the storage device of the storage system used for storing data units included in the first snapshot.

4. The method of claim 1, further comprising: encoding the metadata for the first snapshot, before being transferred to the storage device of the storage system.

5. The method of claim 1, further comprising: retaining the first snapshot at the persistent memory; and deleting a subsequent snapshot taken by the first file system after the second snapshot is taken by the second file system.

6. The method of claim 1, wherein the storage system is a clustered storage system having a network component interfacing with the computing device and a storage component that manages the storage device for storing the second snapshot.

7. The method of claim 1, further comprising: delay processing of a request for a data unit associated with the first snapshot, while the first snapshot is being taken by the first file system.

8. A non-transitory machine-readable storage medium having stored thereon instructions for performing a method, comprising machine executable code which when executed by at least one machine, causes the machine to:

transfer at a first time via a network connection, data units stored at a persistent memory of a computing device managed by a first file system to a storage device of a storage system managed by a second file system, the first file system operating as a persistent memory-based file system;

generate by the first file system, at a second time, a first snapshot of data units remaining at the persistent memory after the data units have been transferred to the storage device of the storage system at the first time;

transfer at a third time, metadata for data units in the first snapshot, metadata associated with data units remaining at the persistent memory between the second and third time, and the data units remaining at the persistent memory between the second and third time;

after the third time, generate a second snapshot of a logical object at the storage device by the second file system, the second snapshot including the transferred metadata at the third time and data units transferred at the first time and the third time; and delete the first snapshot at the computing device, after the second snapshot is generated and releasing storage blocks from the persistent memory associated with the first snapshot.

9. The non-transitory machine readable storage medium of claim 8, wherein the machine executable code further causes the machine to: use the second snapshot for restoring data units and associated metadata for use by the first file system.

10. The non-transitory machine readable storage medium of claim 8, wherein the machine executable code further causes the machine to: after the second snapshot and upon deleting the first snapshot, release data blocks at the storage device associated with data units of the first snapshot.

11. The non-transitory machine readable storage medium of claim 8, wherein the machine executable code further causes the machine to: encode metadata for the first snapshot, before being transferred to the second storage device.

12. The non-transitory machine readable storage medium of claim 8, wherein the machine executable code further causes the machine to: retain the first snapshot at the persistent memory and delete a subsequent snapshot taken by the second file system.

13. The non-transitory machine readable storage medium of claim 8, wherein the storage system is a clustered storage system having a network component interfacing with the computing device and a storage component that manages the storage device for storing the second snapshot.

14. The non-transitory machine readable storage medium of claim 8, wherein the machine executable code further causes the machine to: delay a request for a data unit associated with the first snapshot, while the first snapshot is being taken by the first file system.

15. A system comprising:

a memory containing machine readable medium comprising machine executable code having stored thereon instructions; and a processor module coupled to the memory to execute the machine executable code to:

transfer at a first time via a network connection, valid data units stored at a persistent memory of a computing device managed by a first file system to a storage device of a storage system managed by a second file system, the first file system operating as a persistent memory-based file system;

generate by the first file system, at a second time, a first snapshot of data units remaining at the persistent memory after the data units have been transferred to the storage device of the storage system at the first time;

transfer at a third time, metadata for data units in the first snapshot, metadata associated with data units remaining at the persistent memory between the second and third time, and the data units remaining at the persistent memory between the second and third time;

after the third time, generate a second snapshot of a logical object at the storage device by the second file system, the second snapshot including the transferred metadata at the third time and data units transferred at the first time and the third time; and delete the first snapshot at the computing device, after the second snapshot is generated and releasing storage blocks from the persistent memory associated with the first snapshot.

16. The system of claim 15, wherein the machine executable code further causes to: use the second snapshot for restoring data units and associated metadata for use by the first file system.

17. The system of claim 15, wherein the machine executable code further causes to: after the second snapshot and upon deleting the first snapshot, release data blocks at the storage device associated with data units of the first snapshot.

18. The system of claim 15, wherein the machine executable code further causes to: encode metadata for the first snapshot, before being transferred to the second storage device.

19. The system of claim 15, wherein the machine executable code further causes to: retain the first snapshot at the persistent memory and delete a subsequent snapshot taken by the second file system.

20. The system of claim 15, wherein the machine executable code further causes to: delay a request for a data unit associated with the first snapshot, while the first snapshot is being taken by the first file system.

* * * * *